(No Model.)
A. C. SANFORD.
ORNAMENTAL ATTACHMENT FOR CLOCKS.
No. 253,947. Patented Feb. 21, 1882.
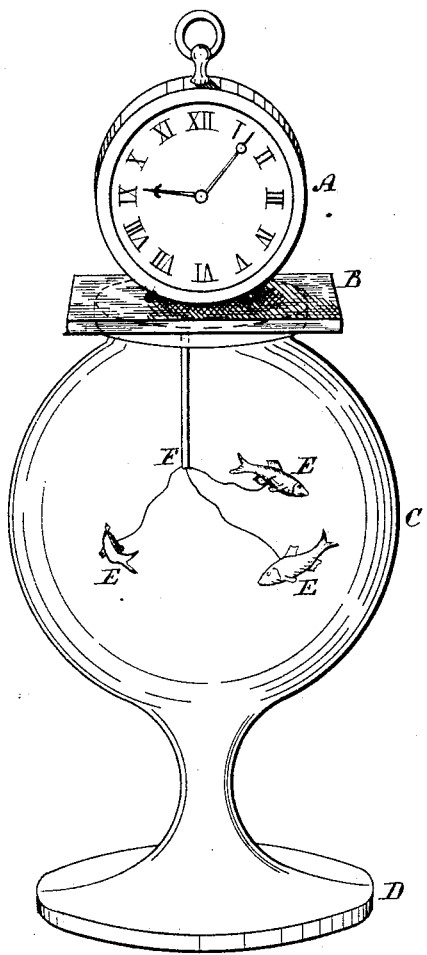
Witnesses.
Chas. L. Burdett.
Edwin F. Dimock.
Inventor
Aaron C. Sanford,
by Theo. G. Ellis, Attorney

UNITED STATES PATENT OFFICE.

AARON C. SANFORD, OF WINSTED, ASSIGNOR TO FRANK S. GRANT, OF ANSONIA, AND FRANK SACKETT, OF WINSTED, CONNECTICUT.

ORNAMENTAL ATTACHMENT FOR CLOCKS.

SPECIFICATION forming part of Letters Patent No. 253,947, dated February 21, 1882.

Application filed July 28, 1881. (No model.)

*To all whom it may concern:*

Be it known that I, AARON C. SANFORD, of Winsted, in the county of Litchfield and State of Connecticut, have invented certain new and useful Improvements in Ornamental Attachments for Clocks; and I do hereby declare that the following is a full, clear, and exact description thereof, whereby a person skilled in the art can make and use the same, reference being had to the accompanying drawing, and to the letters of reference marked thereon.

My improvement relates to an ornamental base or support for a clock, which consists of a globe, such as is ordinarily used for gold-fish, within which imitation fish are suspended and moved by the action of the movement of the clock mechanism.

The object of my invention is to provide a pleasing and ornamental support for the clock which shall appear to contain live fish.

In the accompanying drawing, illustrating my invention, A is a common clock, provided with its ordinary metallic base, B. This clock contains the ordinary mechanism or movement for operating the hands.

C is a glass jar or globe, of the ordinary form and construction, for containing gold-fish, having a top rim adapted to fit the metallic base of the clock. It is furnished with the glass pedestal D in the customary manner.

E E, &c., are imitation fish, which are suspended within the globe by means of the suspending wire or thread F. This may be of fine wire, so as to be nearly invisible; or the fish may be connected by wires and hung by a fine silk or other thread. This passes up into the clock, and may be attached to any revolving vertical spindle, if there be one in the clock mechanism; but if not it is connected with a horizontal arbor or spindle by means of a bevel-wheel or any of the well-known means of converting and changing the direction of motion. This depends upon the construction of the clock. A vertical shaft having a horizontal wheel provided with vertical pins working in one of the ordinary horizontal pinions is commonly sufficient. By means of my invention the fish may be made to seemingly swim round and round inside the globe in the same manner as live fish and possess all the advantages of such without the inconveniences or the necessity of having the globe filled with water.

What I claim as my invention is—

1. The combination, with a clock, A, of the globe C, containing suspended imitation fish E, substantially as described.

2. The combination of the clock A, the globe C, the fish E, and the suspending device F, connected with the clock mechanism, substantially as described.

AARON C. SANFORD.

Witnesses:
F. S. GRANT,
THEO. G. ELLIS.